Patented Nov. 19, 1935

2,021,420

UNITED STATES PATENT OFFICE 2,021,420

LITHOPONE

Gustave A. Kummer, Palmerton, Pa., assignor to The New Jersey Zinc Company, New York, N. Y., a corporation of New Jersey No Drawing. Application December 19, 1930, Serial No. 503,493

1 Claim. (Cl. 134—78)

This invention relates to the manufacture of lithopone and has for its object the provision of certain improvements in lithopone manufacture.

Lithopone is a white pigment composed of zinc sulfide and barium sulfate. The normal lithopones of commerce contain from 27 to 30% zinc sulfide and about 70% barium sulfate. The hiding power or strength of lithopone, as a paint pigment, is due principally to its zinc sulfide content; the barium sulfate functioning mainly as a white, inert diluent. Lithopones of increased hiding power have heretofore been made by increasing the zinc sulfide content over and above that present in normal lithopone. This has been done by mechanically mixing zinc sulfide pigment with normal lithopone in the wet milling thereof (after calcination of both pigments), and also by appropriately increasing the ratio of zinc sulfide to barium sulfate in the precipitation of the crude lithopone.

In the manufacture of normal lithopone, aqueous solutions of zinc sulfate and barium sulfide are mixed in about molecular proportions. Upon the mixing of these solutions there results a heavy, flocculent white precipitate consisting of an intimately associated admixture of zinc sulfide and barium sulfate. The suspension of the coprecipitate of zinc sulfide and barium sulfate in the liquor in which precipitation took place, or in an equivalent liquor such as might result from washing, is known in the industry as crude lithopone pulp or slurry. The co-precipitate after filtration and drying is known as crude lithopone. Crude lithopone is not suitable for paint purposes, but when it is heated, say to a temperature of 650–900° C. and suddenly cooled, as by quenching in water, its physical properties are so modified as to adapt it for paint purposes.

Zinc sulfide pigment may be advantageously made by the process described in the United States patent of Clayton W. Farber, No. 1,742,030, dated December 31, 1929. In accordance with the process of this patent, the crude zinc sulfide is precipitated by mixing aqueous solutions of zinc chloride and a soluble sulfide, such as barium sulfide. The crude precipitate is carefully washed for the removal of soluble salts, particularly chlorides. The suspension of the precipitate in its precipitating liquor or in subsequent wash liquors is known as crude zinc sulfide pulp or slurry. The crude precipitate is filtered and dried, thereby forming what is known in the industry as crude zinc sulfide. Like lithopone, crude zinc sulfide requires calcination to impart thereto certain desirable pigment properties.

Since the calcining temperature of zinc sulfide is generally somewhat lower than the calcining temperature of lithopone, it has heretofore been supposed that the two pigments should be independently calcined when a high strength lithopone is to be produced by adding separately prepared zinc sulfide to normal lithopone. On the other hand, the properties of a high strength lithopone of a given zinc sulfide content produced by adding calcined zinc sulfide to calcined normal lithopone are substantially the same as those of a lithopone of the same zinc sulfide content produced by increasing the ratio of zinc sulfide to barium sulfate in the precipitation of the crude lithopone and calcining at the temperature required for lithopone.

I have discovered that a high strength lithopone of superior physical properties, and in particular of increased hiding power, is produced by mixing separately precipitated crude zinc sulfide with separately precipitated crude normal lithopone, and subjecting the mixed crude pigments to calcination. Thus, I have found that by mixing the crude pigments prior to calcination a high strength lithopone of increased hiding power, or of the same hiding power with a smaller zinc sulfide content, is produced than when the pigments are mixed after their separate calcination.

My present invention thus comprises mixing crude lithopone and crude zinc sulfide, and subjecting the resulting mixed crude pigments to a calcining operation. The crude lithopone and crude zinc sulfide are separately precipitated, as for example in the manner hereinbefore described. The crude zinc sulfide is then added to the crude normal lithopone and mixed therewith in any appropriate manner prior to calcination. Thus, the zinc sulfide and lithopone may be mixed in the form of filter-press cake or dried crude. It is, however, my preferred practice to mix the crude lithopone and crude zinc sulfide pulps in such relative proportions as to give a lithopone of the contemplated zinc sulfide content. The mixing may take place in any appropriate device, as for example, in a paddle mixer. The pulp of the mixed crude pigments is then washed (if necessary), filter-pressed or otherwise appropriately dehydrated, dried, calcined and finished in the manner heretofore common in the art.

Since the crude zinc sulfide precipitate is commonly contaminated with water-soluble salts, such as chlorides, which must be removed before calcination, I prefer to wash the crude zinc sulfide precipitate prior to mixing it with the crude lithopone pulp. In this connection, it is advantageous that both the crude lithopone pulp and the crude zinc sulfide pulp be of appropriate character with respect to the subsequent calcination treatment before the two pulps are mixed together. On the other hand, the washing, or other conditioning treatment of the crude precipitates, may be conducted after the mixing of the crude pulps.

A finished lithopone containing 45% zinc sulfide and made in accordance with this invention possesses equally good hiding power and other desirable pigment properties as a finished lithopone containing 50% zinc sulfide in which the additional zinc sulfide content was added as calcined zinc sulfide to calcined normal lithopone in the wet milling, or other stage following calcination. Moreover, the temperature required for calcining the mixture of separately prepared crude zinc sulfide and crude lithopone is as low, and may even be somewhat lower, than the temperature required for the separate calcination of either the zinc sulfide or the normal lithopone.

I claim:—

The method of making high strength lithopone which comprises precipitating crude lithopone from a body of solution by a reaction between barium sulfide and zinc sulfate, removing the precipitated crude lithopone from the accompanying liquor, precipitating crude zinc sulfide from a separate body of solution by a reaction between zinc chloride and barium sulfide, removing the precipitated crude zinc sulfide from the accompanying liquor, mixing the crude lithopone and crude zinc sulfide, and subjecting the resulting mixture to calcination.

GUSTAVE A. KUMMER.